United States Patent
Angott

(10) Patent No.: US 6,598,692 B2
(45) Date of Patent: Jul. 29, 2003

(54) VEHICLE GUIDANCE-MAINTAINING HORIZONTAL LASER

(75) Inventor: Paul G. Angott, Bloomfield Hills, MI (US)

(73) Assignee: Self-Guided Systems, L.L.C., Bloomfield Hills, MI (US)

( * ) Notice: Subject to any disclaimer, the term of this patent is extended or adjusted under 35 U.S.C. 154(b) by 0 days.

(21) Appl. No.: 09/981,051

(22) Filed: Oct. 16, 2001

(65) Prior Publication Data
US 2003/0070852 A1 Apr. 17, 2003

(51) Int. Cl.⁷ ................................................ B62D 1/24
(52) U.S. Cl. .................... 180/168; 180/169; 356/141.1; 356/141.4
(58) Field of Search ................................ 180/167, 168, 180/169; 356/141.1, 141.4, 4.08; 701/23, 28; 172/4.5

(56) References Cited

U.S. PATENT DOCUMENTS

| | | | | |
|---|---|---|---|---|
| 4,062,634 A | * | 12/1977 | Rando et al. ................ 356/248 |
| 4,706,773 A | * | 11/1987 | Reinaud ....................... 180/169 |
| 4,790,402 A | | 12/1988 | Field et al. .................. 180/169 |
| 4,796,198 A | * | 1/1989 | Boultinghouse et al. ...... 701/23 |
| 4,918,607 A | | 4/1990 | Wible .......................... 364/424 |
| 4,943,158 A | * | 7/1990 | Pertl et al. ................. 356/4.08 |
| 5,137,354 A | | 8/1992 | DeVos et al. ............... 356/152 |
| 5,142,788 A | | 9/1992 | Willetts ........................ 33/227 |
| 5,202,742 A | * | 4/1993 | Frank et al. .................. 356/5.1 |
| 5,204,814 A | * | 4/1993 | Noonan et al. ............... 701/25 |
| 5,241,481 A | | 8/1993 | Olsen .......................... 364/449 |
| 5,255,195 A | | 10/1993 | Mochizuki et al. ......... 364/449 |
| 5,260,770 A | | 11/1993 | Nakamura et al. ........... 356/375 |
| 5,280,491 A | | 1/1994 | Lai .............................. 372/24 |
| 5,313,262 A | * | 5/1994 | Leonard ..................... 356/4.01 |
| 5,426,584 A | | 6/1995 | Kamimura et al. ............ 701/25 |
| 5,467,273 A | | 11/1995 | Fabish et al. .......... 364/424.02 |
| 5,612,967 A | | 3/1997 | Lai .............................. 372/22 |
| 5,812,267 A | * | 9/1998 | Everett et al. .............. 356/614 |
| 5,867,522 A | | 2/1999 | Green et al. ................... 372/99 |
| 5,983,157 A | | 11/1999 | Sugitani ..................... 701/207 |
| 6,008,925 A | | 12/1999 | Conemac .................... 359/204 |
| 6,433,866 B1 | * | 8/2002 | Nichols .................... 356/141.1 |
| 6,452,665 B1 | * | 9/2002 | Kikuchi .................... 356/4.01 |
| 6,460,260 B1 | * | 10/2002 | Alster ......................... 33/227 |
| 6,493,067 B1 | * | 12/2002 | Kodaira et al. ............ 356/4.08 |

* cited by examiner

Primary Examiner—Paul N. Dickson
Assistant Examiner—Laura B. Rosenberg
(74) Attorney, Agent, or Firm—Howard & Howard

(57) ABSTRACT

The guidance assembly includes a diode device (30, 130, 230) for emitting a vertical line of laser light (32). The assembly is characterized by an alignment mechanism for maintaining the vertical line of laser light (32) in parallel alignment with gravity to compensate for misalignment of the upright axis of the carriage (12) from vertical to maintain the vertical line of laser light (32) aligned with gravity as the carriage (12) moves over an uneven plot. In the first and second embodiments of FIGS. 2 through 5, the alignment mechanism includes a rotary motor (38 and 138), for rotating the diode device (30, 130) for rotating the vertical line (32) relative to the upright axis of the carriage (12). The third embodiment of FIGS. 6 and 7 implements the generic concept of maintaining the vertical line of light (32) aligned with gravity by an alignment mechanism including a leveling device (238) for maintaining the platform (28) perpendicular to vertical gravity and to move the vertical line (32) relative to the upright axis of the carriage (12).

22 Claims, 5 Drawing Sheets

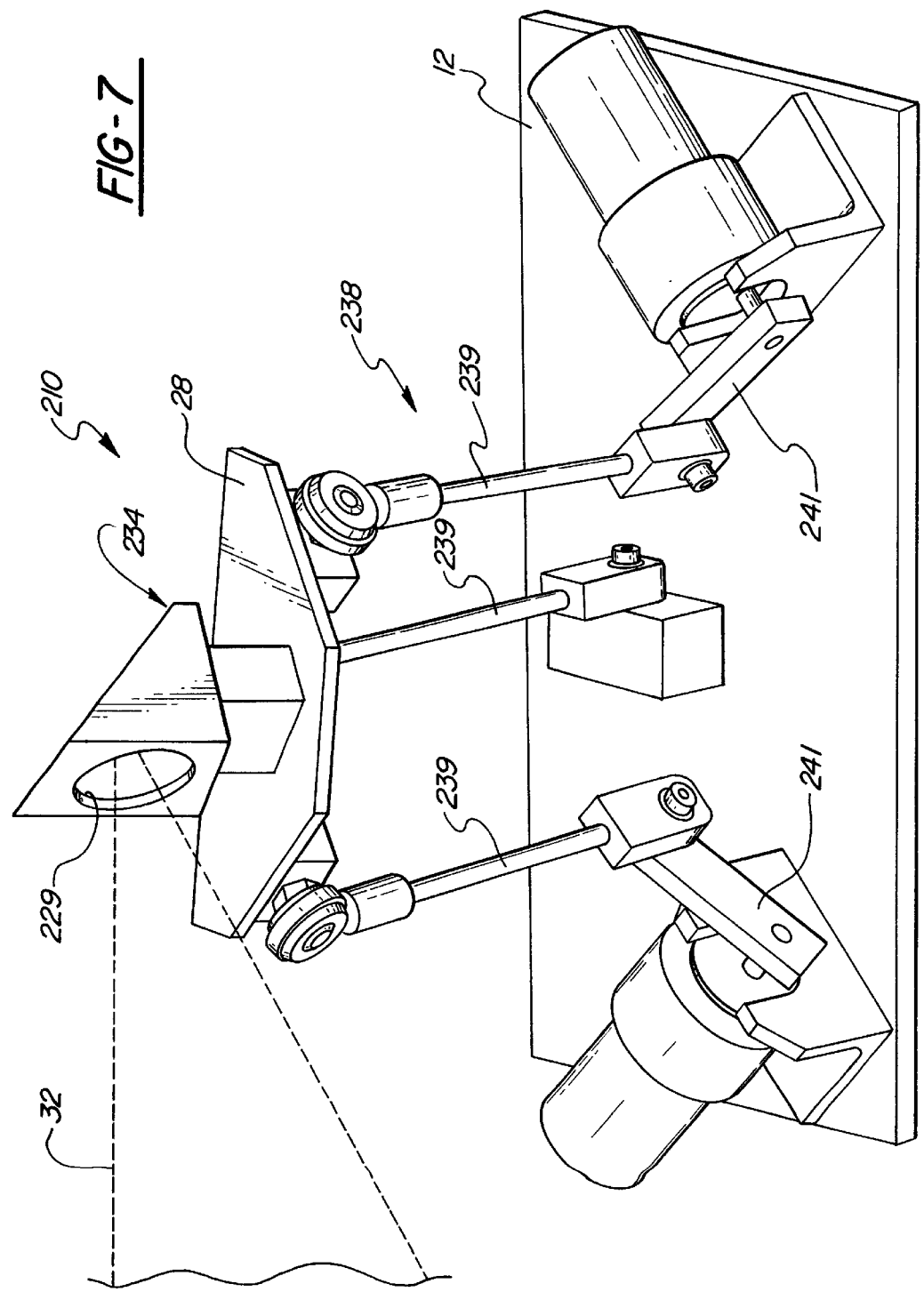

VEHICLE GUIDANCE-MAINTAINING HORIZONTAL LASER

BACKGROUND OF THE INVENTION

1. Field of the Invention

A utility vehicle guidance assembly for guiding a carriage, such as a lawnmower, over a plot of land, particularly a plot of uneven terrain.

2. Description of the Prior Art

A variety of guidance assemblies are known for guiding equipment such as lawnmowers over a lawn and many utilize a laser light beam in determining the position of the lawnmower on the lawn. A diode emits a beam of laser light in the generally horizontal direction and a support rotates the horizontal beam about a transverse axis which is upright relative to the carriage to move the horizontal beam radially between circumferentially spaced locating stations. The locating stations reflect the beam back to the carriage where it is processed to determine the position of the lawnmower and to control the guidance of the lawnmower over the terrain. An example of such an assembly is disclosed in U.S. Pat. No. 4,790,402 to Field et al., U.S. Pat. No. 4,918,607 to Wible, U.S. Pat. No. 5,142,788 to Willetts, U.S. Pat. No. 5,260,770 to Nakamura et al, and U.S. Pat. No. 5,426,584 to Kamimura et al.

Although such systems perform satisfactorily, there remains a constant desire to simplify and reduce the expense of such systems while retaining performance. A major performance criteria is to sweep the horizontal beam vertically sufficiently to reflect from locator stations that are of a minimum height as the lawnmower moves over very uneven or undulating terrain. Simultaneously with the vertical sweep of the horizontal beam it is necessary to maintain the vertical sweep in line with gravity, i.e., vertical, in order to obtain precise position data. This criterion requires an inexpensive and simplified system to compensate for misalignment of the upright axis of the lawnmower from vertical as the lawnmower moves over uneven terrain, i.e., non-horizontal as in undulating terrain.

SUMMARY OF THE INVENTION AND ADVANTAGES

The subject invention provides a method of guiding a carriage having an upright axis over a plot comprising the steps of emitting a vertical line of laser light defining a beam extending in the generally horizontal direction and generally radially from the upright axis, and rotating the horizontal beam about the upright axis to move the horizontal beam between circumferentially spaced locating stations. The method is characterized by moving the vertical line of light relative to the upright axis to compensate for misalignment of the upright axis from vertical in response to movement of the carriage over non-horizontal terrain.

In order to implement the method the invention includes a laser guidance assembly for a land vehicle having an upright axis comprising a diode device for emitting a vertical line of laser light, and a beam director for directing the vertical line of light in a horizontal beam and rotating the horizontal beam about a beam director axis to move the horizontal beam between circumferentially spaced locating stations. The assembly is characterized by an alignment mechanism for maintaining the vertical line of light in parallel alignment with gravity to compensate for misalignment of the upright axis of the vehicle from vertical to maintain the vertical line of laser light aligned with gravity as the vehicle moves over an uneven plot.

Accordingly, the invention provides a unique, simple and relatively inexpensive solution to the criteria of providing a wide variance in the vertical sweep of the horizontal beam in order to reflect the horizontal beam from relatively small locating stations notwithstanding a wide variance in the orientation of the upright axis of the vehicle due to movement over undulating terrain.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7 is a perspective view of the third embodiment.

DETAILED DESCRIPTION OF THE PREFERRED EMBODIMENTS

Figure 1:
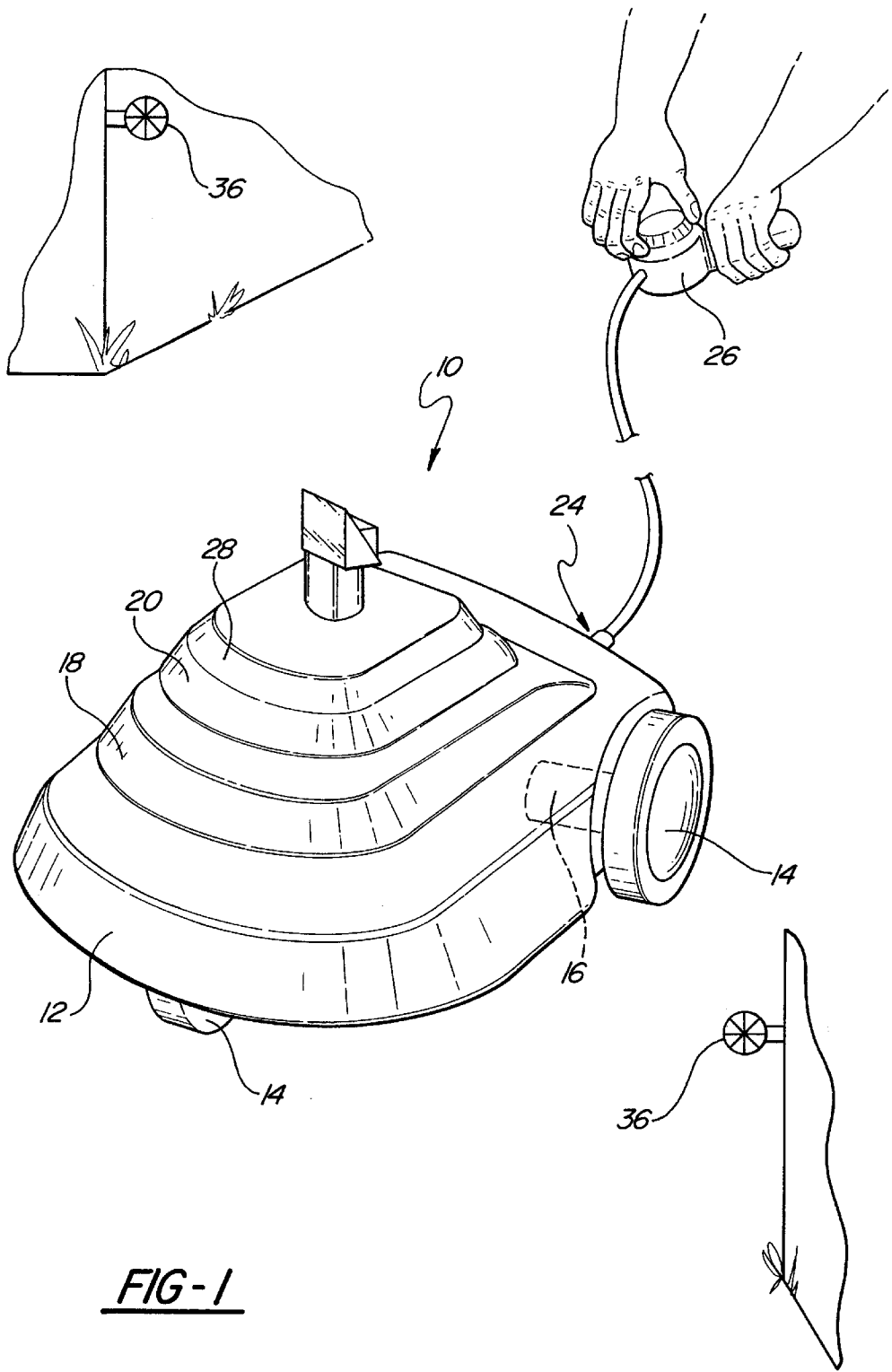
FIG. 1 is a perspective view of a lawnmower utilizing the subject invention.
Figure 2:
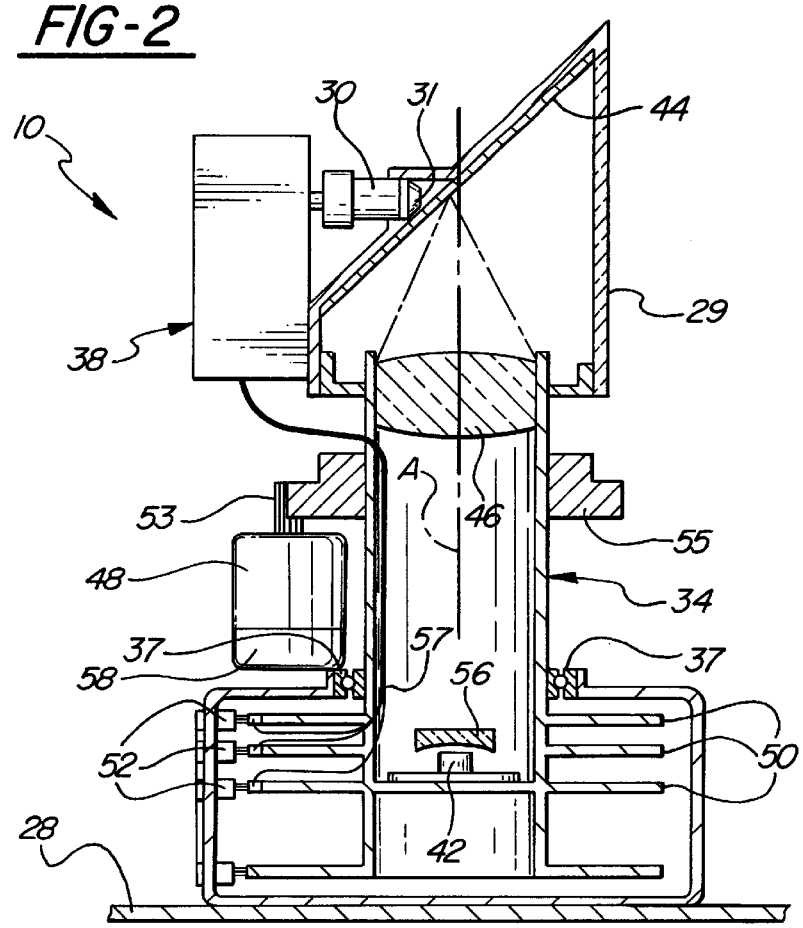
FIG. 2 is a cross sectional view of a first embodiment of the subject invention.
Figure 4:
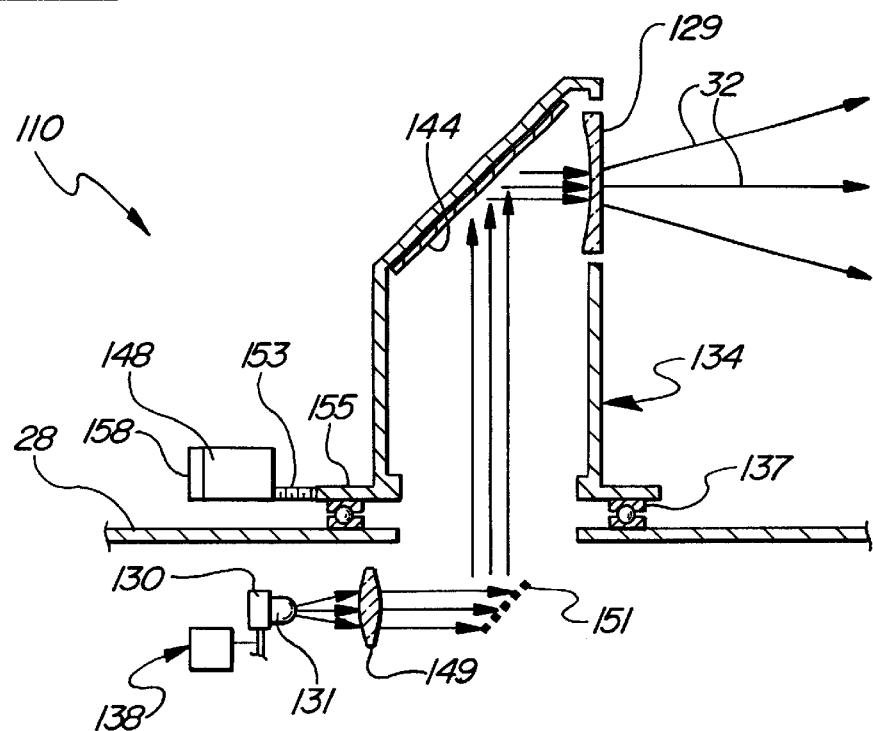
FIG. 4 is a schematic view of a second embodiment showing the outgoing line of light.
Figure 5:
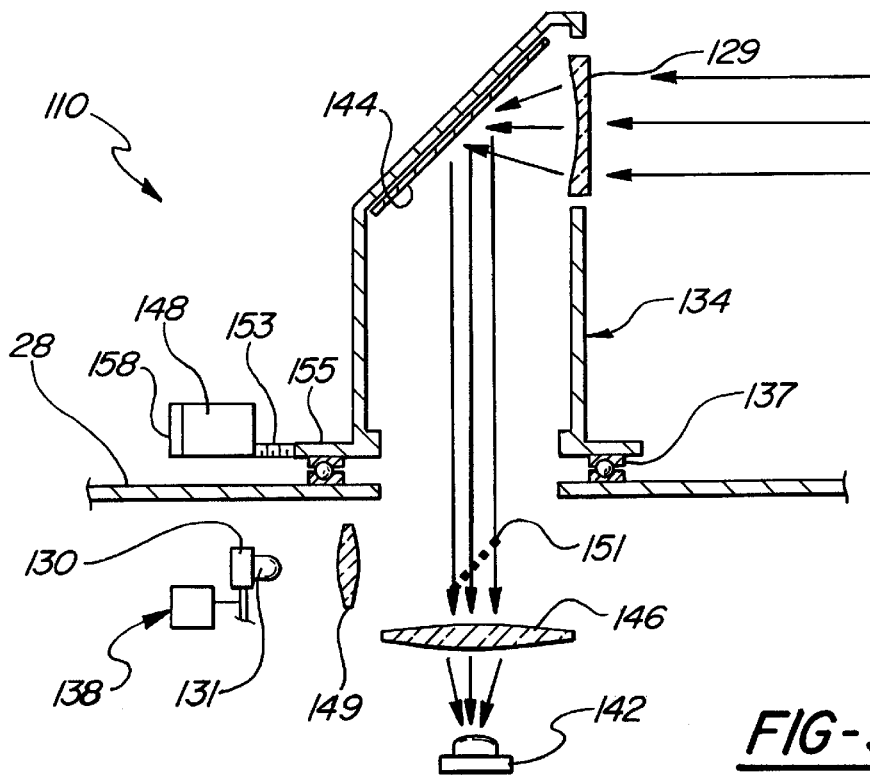
FIG. 5 is a schematic view of the second embodiment showing the reflected beam of light.
Figure 6:
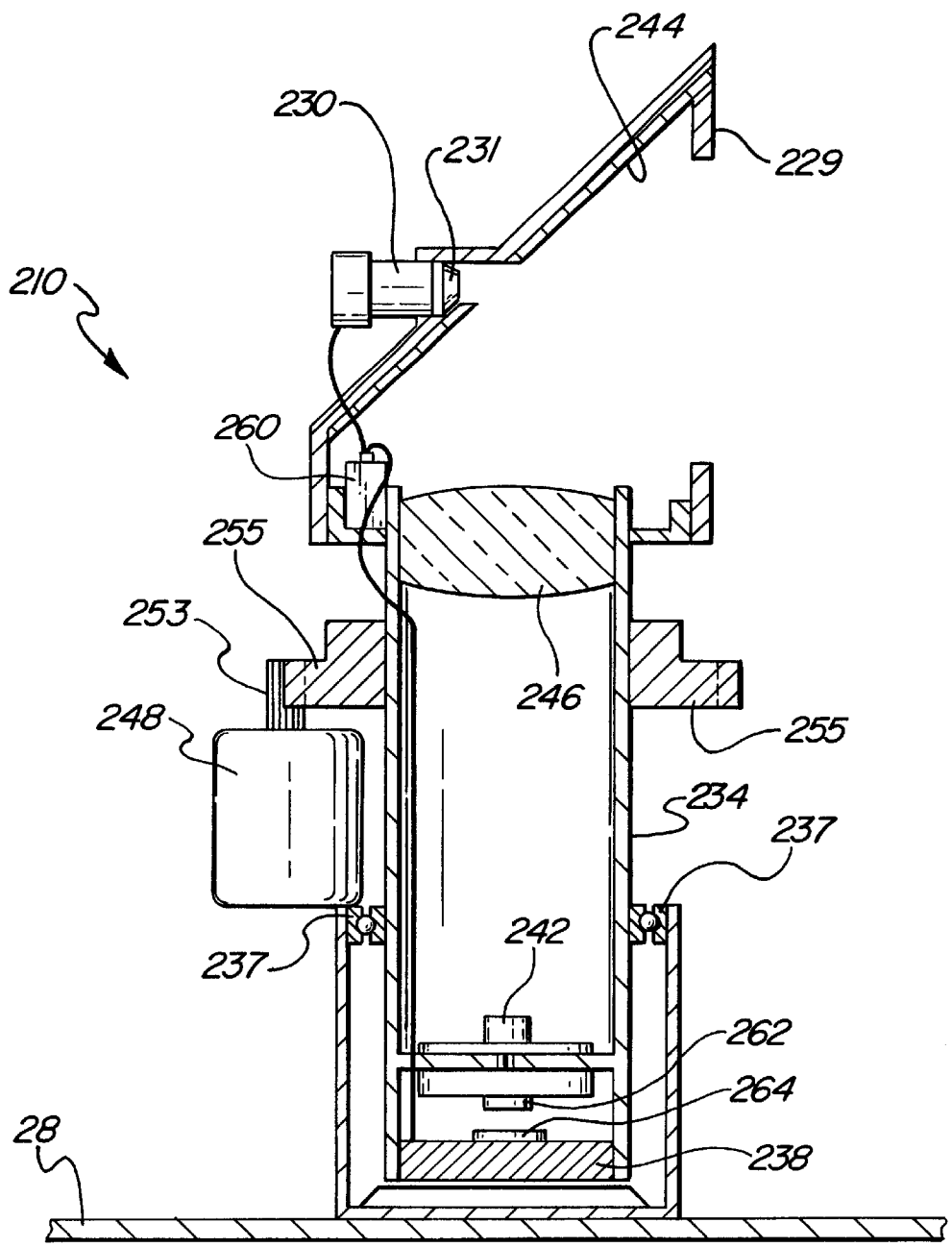
FIG. 6 is a cross sectional view of a third embodiment.

Referring to the Figures, wherein like numerals differing by one hundred indicate like or corresponding parts throughout the views of the three embodiments, a utility vehicle guidance assembly is generally shown at 10 in FIGS. 1 and 2, 110 in FIGS. 4 and 5 and at 210 in FIGS. 6 and 7.

The guidance assembly may be used with a vehicle carriage such as the lawnmower, generally indicated at 12 in FIG. 1. However, it is to be understood that the subject invention is advantageous for use with other equipment including, but not limited to, agricultural equipment, snow removal equipment, and beach cleaning equipment. The carriage 12 has wheels 14 for moving by rolling over a plot of terrain, i.e., and described herein as a lawn. Individual electrical motors 16 drive the wheels 14. Each of the individual electric motors 16 include an encoder (not shown), as is known in the art, for measuring the rotation of the electrical motors 16, thereby measuring the speed of the carriage 12. A main electric motor 18 rotates a cutting blade as is well known in the art. The cutting blade may include additional blades, and is preferably three blades. The differential, forward and reverse rotation of the electric motors and wheels steer the carriage 12 over the terrain. A central processing unit (CPU) 20, or processor, is supported on the carriage 12 for controlling the electric motors 16 and 18 which comprise a power unit for controlling the direction of movement of the lawnmower and rotation of the cutting blade. The processor 20 may slow the speed of the carriage 12 and the blade as required for selected areas of the plot. A programming pad 26 is removably attached to the carriage 12 by a quick disconnect 24 for programming the CPU 20. A platform 28 is supported by the carriage 12 for supporting the guidance assembly 10.

The guidance assembly, shown in more detail in FIGS. 2–7, includes a diode device 30, 130, 230 for emitting a vertical line of laser light 32. The diode device 30, 130, 230 includes a beam forming device or lens 31, 131, 231 for forming the horizontal beam of laser light in a vertical line 32. The vertical line 32, for commercial applications, is about a half inch wide and extends about one hundred and fifty feet vertically or high at a distance of three hundred feet from the lens 31, 131, 231. The vertical line 32, for residential applications, is about a half inch wide and extends about fifty high at a distance of one hundred and fifty feed from the lens 31, 131, 231. The height of the vertical line 32 may be adjusted for any distance depending upon the particular application of the equipment. A beam director 34, 134, 234 is included for directing the vertical line of light in a horizontal beam through a window or lens 29, 129, 229 and rotating the horizontal beam about a beam director axis A to move the horizontal beam between circumferentially spaced locating stations 36. The beam director 34, 134, 234, in another embodiment may include a plurality of beam directors for directing a plurality of vertical lines of light. In this embodiment, the beam directors 34, 134, 234 may have a reduced horizontal beam because the beam directors 34, 134, 234 may be stacked on top of each other. It is to be understood that the beam directors 34, 134, 234 may be directed in other directions from one another.

The window or lens 29, 129, 229 may be removed for allowing the horizontal beam to pass through, as shown in FIG. 2. Therefore, the beam director 34, 134, 234 includes the first lens 31, 131, 231 for forming the horizontal beam of laser light. The beam director 34, 134, 234 is rotatably supported on the platform 28 through bearings 37, 137, 237. The beam director 34, 134, 234 may produce a constant beam of light or the beam of light may be pulsed depending upon the requirements of the equipment. In the preferred embodiment, the beam of light is pulsed at 400 KHz.

The assembly is characterized by an alignment mechanism for maintaining the vertical line of laser light 32 in parallel alignment with gravity to compensate for misalignment of the upright axis of the carriage from vertical to maintain the vertical line of laser light 32 aligned with gravity as the carriage 12 moves over an uneven plot. In the first and second embodiments of FIGS. 2 through 5, the alignment mechanism includes a rotary device or motor, generally indicated at 38 and 138, for rotating the diode device 30, 130 thereby rotating the vertical line 32 relative to the upright axis of the carriage 12 to compensate for misalignment of the upright axis from vertical to maintain the vertical line 32 in line with gravity as the carriage moves over an uneven plot. In other words, as the upright axis of the carriage 12 is moved from vertical, i.e., an alignment with gravity, the alignment motor 38, 138 rotates the lens 31, 131, and/or diode 30, 130 about the longitudinal axis of the beam to maintain the vertical line 32 of the beam aligned with vertical or gravity.

In the first embodiment of FIG. 2, diode device 30 is supported by the beam director 34 and the rotary device or motor 38 is also supported on the beam director 34. However, in the second embodiment of FIGS. 4 and 5, diode device 130 is supported by the platform 28 and the rotary device or motor 138 is also supported on the platform 28. The first and second embodiments are subspecies of the rotation of the beam species.

The third embodiment of FIGS. 6 and 7 is a species of the generic concept of maintaining the vertical line of light 32 aligned with gravity wherein the alignment mechanism includes a leveling device 238 for maintaining the platform 28 perpendicular to vertical gravity and to move the vertical line 32 relative to the upright axis to compensate for misalignment of the upright axis from vertical to maintain the vertical line 32 aligned with gravity as the carriage 12 moves over an uneven plot. The leveling device 238 includes three linkages 239 extending from the carriage 12 and attached to the platform 28 in a triangular pattern. At least two of the three linkages 239 are extendable for maintaining the platform 28 level relative to gravity as the carriage 12 moves over an uneven plot. The linkages 239 are extendable by motor-cam or crank drives 241 which reciprocate two of the linkages up and down to vary the attitude or orientation of the platform 28 relative to the carriage 12, i.e., maintaining the platform level at all orientations of the carriage 12. The motor-crank drives 241 are controlled by the CPU. The motor-crank drives 241 are driven by a motor, which is attached to the carriage 12. Therefore, one of the linkages 239 is connected to the carriage 12 and the other linkages 239 are connected to the motor-crank drives 241. Alternately, the leveling device 238 may be include a gimbaled system, such that the platform 28 would be connected to rings of the gimbaled system. The gimbaled system is also connected to the motor-crank drives 241 for maintaining the platform 28 level at all orientations of the carriage 12.

The assembly 210 in FIG. 6 also includes a laser module 238 supported by the beam director 234 and connected to the processor 20. The laser module 238 includes a second diode device 262 and a second detector 264. When the detector 242 receives the reflected beam, the second diode device 262 generates a beam of light which is detected by the second detector 264. The laser module 238 then sends a signal to the processor 20 that links the detection of the reflected beam with the emission of the beam. The laser module 238 improves the signal to noise ratio of the guidance assembly 210. The laser module 238 is also connected to a generator 260 for driving the diode device 230. The generator 260 is supported by the beam director 234, which provides a safety feature of not emitting the beam of light unless the beam director 234 is being rotated.

Figure 3:
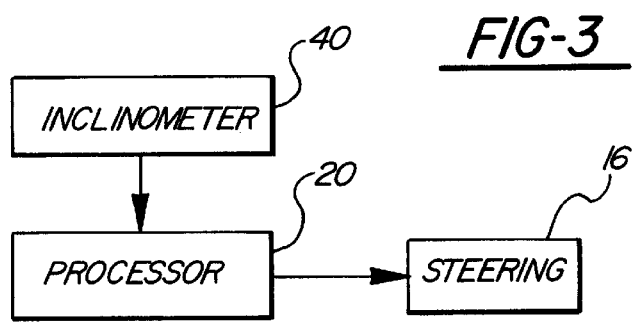
FIG. 3 is a block diagram of a control system used in the subject invention.

The assembly includes an inclinometer 40, as shown in FIG. 3, for determining deviation from parallel between the upright axis of the carriage 12 and vertical. The CPU 20 receives an attitude signal from the inclinometer 40 for controlling the alignment mechanism to maintain the line of light 32 vertically oriented. In the preferred embodiment, the inclinometer 40 is further defined as a dual axis accelerometer and two rate gyros. When the processor 20 receives the attitude signal, the processor 20 interprets the signal and operates the motor-crank drives 241 to maintain the platform 28 level.

The plurality of locating stations 36 are positioned for reflecting the horizontal beam back from the locating stations 36, as indicated by arrowhead lines in FIG. 5. A detector 42, 142, 242 is included for detecting the reflected beam from the locating stations 36 to generate a signal. The processor 20 is responsive to that signal for locating the carriage 12 from the reflected beam and guiding the carriage 12 over the plot in response to continuous locating of the carriage 12. A mirror 44, 144, 244 is supported by the beam director 34, 134, 234 for rotation therewith and reflecting the reflected beam to the detector 42, 142, 242. Additionally, the mirror 44, 144, 244 may include an aperture for allowing the vertical line 32 to pass through, while still reflecting the reflected beam. A filter 56 is positioned adjacent the detector 42 for filtering out other light, such as sunlight. A second lens 46, 146, 246 is included for directing the reflected beam to the detector 42, 142, 242. It is to be understood that the second lens may include additional lens for providing the reflected beam to the detector 42, 142, 242. The second lens in the Figures, is illustrated as a single lens, however, in the preferred embodiment, the second lens incorporates seven different lenses for focusing the reflected beam. The number of lens depends upon the strength of the reflected beam and the quality of the lens. The number of lens may be modified while still carrying out the subject invention. In the first and third embodiments of FIGS. 2 and 6, the beam director 34, 234 supports the second lens 46, 246. In the second embodiment of FIG. 5, the second lens 146 is supported by the platform 28.

In the second embodiment, an aiming lens 149 is included for focusing the vertical line of light 32, which is reflected by a two-way or perforated mirror 151. The two-way mirror 151 passes the reflected light from the mirror 144 to the detector 142.

In each embodiment, a main motor 48, 148, 248 rotates the beam director 34, 134, 234 relative to the platform 28 through a pinion 53, 153, 253 in meshing engagement with a spur gear 55, 155, 255. The main motor 48, 148, 248, preferably rotates the beam director 34, 134, 234 at six revolutions per second. The main motor 48, 148, 248 includes an encoder 58, as is know in the art, for measuring the rotation of the main motor 48, 148, 248. As the main motor 48, 148, 248 is rotated, the encoder 58 measures the rotations and transmits a signal to the processor 20. In the embodiment of FIG. 2, a plurality of slip rings 50 and brushes 52 transmit electrical energy to the alignment drive motor 48 via electrical leads 57.

Through the geometry of the locating stations 36 relative to the carriage 12, the processor 20 continuously calculates the position of the carriage on the plot by using the signal received from the encoder 58. The processor 20 sends signals to the motors 38, 138, 238 to guide the carriage 12 over the plot in response to the calculating the position from the encoder 58 signals and from the detector 42, 142, 242 signals. In this calculation, it is important to keep the line of light 32 in a vertical orientation. Accordingly, the reference of vertical, that is, gravity vertical is determined by the inclinometer 40, as described above. The processor 20 triangulates the position of the carriage 12 by using the signals from the reflected beam being detected by the detector 42, 142, 242 and the signals from the encoder 58 measuring the rotation of the motors 38, 138, 238.

The invention provides a method of guiding the carriage 12 12 having an upright axis over the plot comprising the steps of emitting the vertical line 32 of laser light defining the beam extending in the generally horizontal direction and generally radially from the upright axis and rotating the horizontal beam about the upright axis to move the horizontal beam between circumferentially spaced locating stations 36. The method is characterized by moving the vertical line of light 32 relative to the upright axis to compensate for misalignment of the upright axis from vertical in response to movement of the carriage 12 over non-horizontal terrain. The method is further defined as determining deviation from parallel between the upright axis and vertical and maintaining the line of light vertically oriented regardless of the deviation from vertical of the upright axis. In accordance with the method, the horizontal beam is reflected in the reflected beam back from the locating stations 36 and includes the steps of detecting the reflected beam from the locating stations 36, locating the carriage 12 from the reflected beam, and guiding the carriage 12 over the plot in response to continuous locating of the carriage 12. In a subgeneric species, the moving of the vertical line 32 is further defined as rotating the vertical line 32 of light relative to the upright axis. In another species, the moving of the vertical axis is further defined as maintaining the rotation of the horizontal beam about an axis aligned with gravity regardless of the orientation of the upright axis.

Accordingly, the invention provides a method of guiding the carriage 12 over the plot comprising the steps of emitting the vertical line 32 of laser light defining the beam extending in the generally horizontal direction and rotating the horizontal beam about the transverse axis which is upright relative to the carriage 12 to move the horizontal beam radially between circumferentially spaced locating stations 36. The method is characterized by rotating the vertical line 32 of light relative to the upright axis to compensate for misalignment of the upright axis from vertical in response to movement of the carriage 12 over non-horizontal terrain.

The method also includes the step of determining deviation from parallel between the upright axis and vertical and maintaining the line of light vertically oriented regardless of the deviation from vertical of the upright axis. Also included are the steps of reflecting the horizontal beam in the reflected beam back from the locating stations 36, detecting the reflected beam from the locating stations 36, locating the carriage 12 from the reflected beam, and guiding the carriage 12 over the plot in response to continuous locating of the carriage 12.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility.

What is claimed is:

1. A utility vehicle guidance sub-assembly comprising;
   a carriage for moving over a plot and having a vertical axis defining an upright carriage axis,
   a diode device for emitting a vertical line of laser light,
   a beam director for directing the vertical line of light in a horizontal beam and rotating the horizontal beam about a beam director axis to move the horizontal beam between circumferentially spaced locating stations,
   said assembly characterized by an alignment mechanism for maintaining the vertical line of laser light in parallel alignment with gravity to compensate for misalignment of said upright axis of said carriage from vertical to maintain the vertical line of laser light aligned with gravity as said carriage moves over an uneven plot.

2. An assembly as set forth in claim 1 including an inclinometer for determining deviation from parallel between said upright axis and vertical and a processor for receiving an attitude signal from said inclinometer for controlling said alignment mechanism to maintain said line of light vertically oriented.

3. An assembly as set forth in claim 2 including a plurality of locating stations for reflecting the horizontal beam back from the locating stations, a detector for detecting a reflected beam from said locating stations to generate a signal, said processor being responsive to said signal for locating said carriage from the reflected beam and guiding said carriage over the plot in response to continuous locating of said carriage.

4. An assembly as set forth in claim 2 including a support platform supported on said carriage, said beam director being rotatably supported on said platform.

5. An assembly as set forth in claim 4 wherein said alignment mechanism includes a rotary device for rotating said diode device for rotating the vertical line relative to the upright axis to compensate for misalignment of the upright axis from vertical to maintain the vertical line in line with gravity as the carriage moves over an uneven plot.

6. An assembly as set forth in claim 5 wherein said diode device is supported by said beam director and said rotary device is supported on said beam director.

7. An assembly as set forth in claim 5 wherein said diode device is supported by said platform and said rotary device is supported on said platform.

8. An assembly as set forth in claim 4 wherein said alignment mechanism includes a leveling device for maintaining said platform perpendicular to vertical gravity and to move the vertical line relative to the upright axis to compensate for misalignment of the upright axis from vertical to maintain the vertical line in line with gravity as the carriage moves over an uneven plot.

9. An assembly as set forth in claim 8 wherein said leveling device includes three linkages extending from said carriage and attached to said platform in a triangular pattern, at least two of said linkages being extendable for maintaining said platform level relative to gravity as the carriage moves over an uneven plot.

10. An assembly as set forth in claim 8 wherein said leveling device includes a gimbal extending from said carriage and attached to said platform for maintaining said platform level relative to gravity as the carriage moves over an uneven plot.

11. An assembly as set forth in claim 2 including a plurality of locating stations for reflecting the horizontal beam back from the locating stations, a detector for detecting a reflected beam from said locating stations to generate a signal, said processor being responsive to said signal for locating said carriage from the reflected beam and guiding said carriage over the plot in response to continuous locating of said carriage, a mirror supported by said beam director for rotation therewith and reflecting the reflected beam to said detector.

12. An assembly as set forth in claim 11 wherein said beam director includes a first lens for forming said horizontal beam of laser light.

13. An assembly as set forth in claim 12 including a second lens for directing the reflected beam to said detector.

14. An assembly as set forth in claim 13 wherein said second lens is supported by said beam director.

15. An assembly as set forth in claim 13 wherein said second lens is supported by said platform.

16. An assembly as set forth in claim 2 including a main motor for rotating said beam director relative to said platform.

17. An assembly as set forth in claim 1 including a plurality beam directors for directing a plurality of vertical lines of light in the horizontal beam and rotating the horizontal beam about a beam director axis to move the horizontal beam between circumferentially spaced locating stations.

18. A laser guidance sub-assembly for a land vehicle having an upright axis comprising;
a diode device for emitting a vertical line of laser light,
a beam director for directing the vertical line of light in a horizontal beam and rotating the horizontal beam about a beam director axis to move the horizontal beam between circumferentially spaced locating stations,
said assembly characterized by an alignment mechanism for maintaining the vertical line of light in parallel alignment with gravity to compensate for misalignment of said upright axis of the vehicle from vertical to maintain the vertical line of laser light aligned with gravity as said vehicle moves over an uneven plot.

19. A method of guiding a carriage having an upright axis over a plot comprising the steps of;
emitting a vertical line of laser light defining a beam extending in the generally horizontal direction and generally radially from an upright axis,
rotating the horizontal beam about the upright axis to move the horizontal beam between circumferentially spaced locating stations, and reflecting the horizontal beam in a reflected beam back from locating stations, detecting the reflected beam from the locating stations, locating the carriage from the reflected beam, and guiding the carriage over the plot in response to continuous locating of the carriage,
said method characterized by moving the vertical line of light relative to the upright axis to compensate for misalignment of the upright axis from vertical in response to movement of the carriage over non-horizontal terrain.

20. A method as set forth in claim 19 including determining deviation from parallel between the upright axis and vertical and maintaining the line of light vertically oriented regardless of the deviation from vertical of the upright axis.

21. A method as set forth in claim 20 wherein the moving the vertical line is further defined as rotating said vertical line of light relative to the upright axis.

22. An assembly as set forth in claim 20 further defined as maintaining the rotation of the horizontal beam about an axis aligned with gravity regardless of the orientation of the upright axis.

* * * * *